Jan. 10, 1933.  K. JUNG  1,893,995
BEARING FOR ACCURATELY RUNNING SHAFTS USING BALL BEARINGS
Filed May 20, 1930
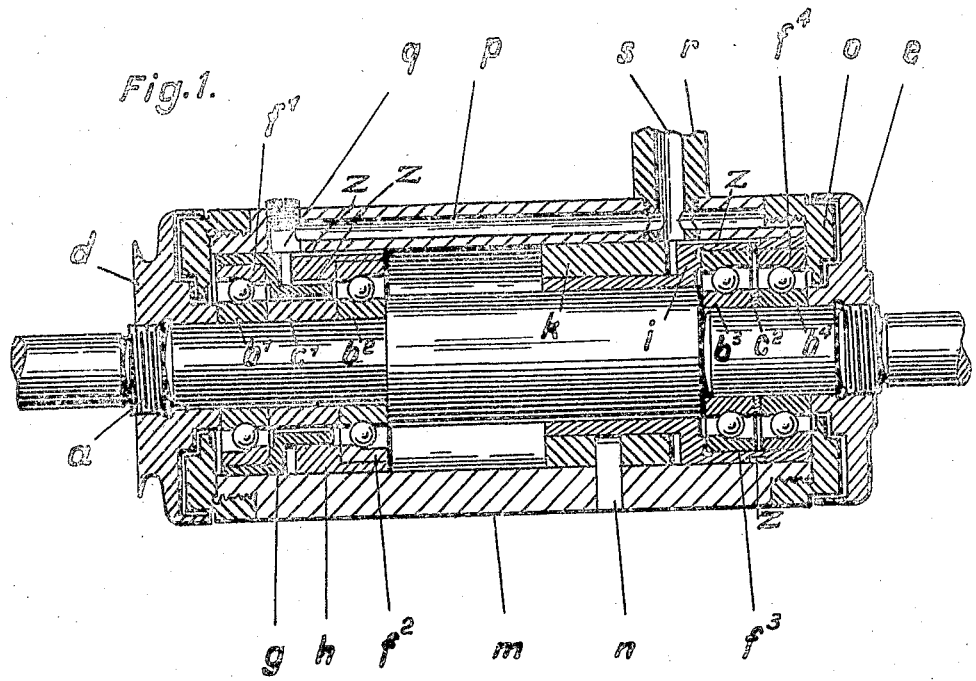
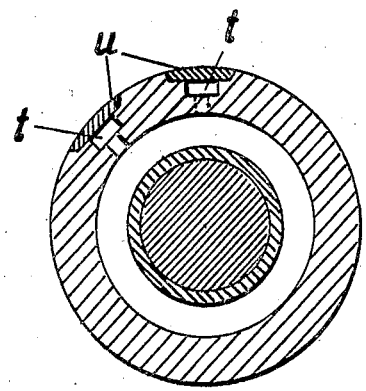
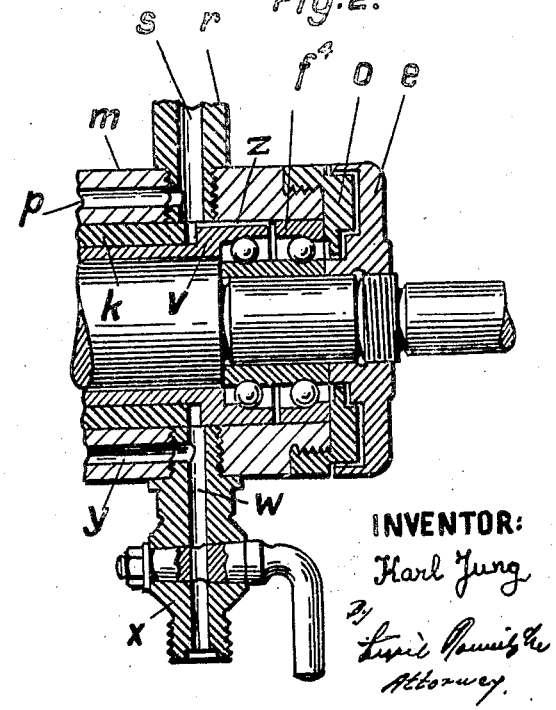
INVENTOR:
Karl Jung Patented Jan. 10, 1933

1,893,995

UNITED STATES PATENT OFFICE

KARL JUNG, OF BERLIN, GERMANY

BEARING FOR ACCURATELY RUNNING SHAFTS USING BALL BEARINGS

Application filed May 20, 1930, Serial No. 454,079, and in Germany March 7, 1930.

Adjustable ball bearings for accurately running shafts are already known in which one ball race is axially movable to allow any play in the bearing to be compensated for. It has already been proposed to effect the adjustment of the bearing automatically. The known devices of this type depend for their operation upon springs or wedges or similar pressure devices. The disadvantage of these devices is that the suspension of the bearing is uneven and must be separately effected for each group of bearings.

The present invention has for its object to provide a completely satisfactory adjustment of the ball bearings and consists in replacing the mechanical pressure means by liquid or gaseous means (air, oil, grease, etc.). When using compressed air, this may be moistened with oil and small vents provided so that a part of the air flows over the moving surfaces and there gives up its oil, whereby even and thorough lubrication of the moving parts is effected.

The device may also be used for simultaneously cooling the bearing by allowing the pressure medium which is fed in at a given pressure, to flow out again at a relatively lower pressure. Only the difference in pressure is then effective but the continuous circulation of fresh cooled pressure medium effects the cooling of the whole bearing.

An embodiment of the invention is shown in the drawing, in which:—

Figure 1 is a longitudinal section through a bearing in accordance with the invention, Fig. 2 is a part of Figure 1 in a somewhat modified construction, Fig. 3 is a cross section through Figure 1.

$a$ is the shaft on which the races $b1, b2, b3, b4$ of the four ball bearings are mounted. The inner races $b2, b3$ rest against projections or shoulders on the shaft. Between the pairs of races spacing rings $c1$ and $c2$ are arranged which maintain the races at the correct distance from each other; the outer races $b1$ and $b4$ rest against end caps $d$ and $e$ which are threaded onto the shaft. The outer races $f1, f2, f3, f4$ are, in known manner, so constructed that they bear against the balls on one side only, so that the bearings can be taken up by axially adjusting these races. According to the invention annular pistons are provided which automatically effect this adjustment under the influence of a pressure liquid or compressed air. The annular piston $g$ is formed pot shaped; its outer edge encircles the outer race $f1$ and its shoulder rests against the side surface of the race $f1$. The race $f2$ is encircled by a similar annular piston $h$ having an inwardly projecting flange which rests against the inner surface of the race $f2$. Between the adjacent faces of the two annular pistons $g$ and $h$ is a space into which the pressure liquid or compressed air is introduced.

In the bearings shown on the left of the drawing the shoulders are on the inside; consequently, to effect the adjustment the races $f1$ and $f2$ must be forced apart, and this may be effected by introducing pressure medium into the gap provided between the parts $g$ and $h$.

On the other side, the outer races $f3$ and $f4$ are so arranged that to effect the adjustment the races must be approached to each other. For this purpose an annular pot-shaped piston $i$ is provided which encircles both races and has a shoulder which rests against the race $f3$. A ring $k$ is also provided which is secured, by means for example, of a pin $n$, to the outer casing $m$ enclosing the entire bearing. Between the ring $k$ and the shell $i$ an annular space is provided which can be filled by a pressure medium. In this case, as the race $f4$ is prevented from moving to the right by a nut $o$ which is threaded onto the outer casing $m$, the race $f3$ is pressed towards the race $f4$. To allow the introduction of the pressure medium a bore $p$ is provided in the outer casing $m$ which on the left hand side is connected through a bore $q$ with the annular space between the parts $g$ and $h$ and on the right hand side communicates through the bore $s$ in the nipple $r$ with the annular space between $k$ and $i$. The nipple $r$ serves for the introduction of the pressure medium.

The bore $p$ may suitably be constructed in the manner shown in Figure 3; that is, a groove $t$ is cut over the whole length of the casing $m$ and is then closed from without by a cover plate $u$ which is secured to the casing $m$ by welding soldering or hammering thus forming the groove $t$ into a closed channel. Naturally, as shown in Figure 3, a number of such channels $t$, for example two, may be distributed over the periphery.

The device can also be used for simultaneously lubricating the moving surfaces. For this purpose, air moistened with oil is preferably used as the pressure medium, and small clearances $z$ are arranged at suitable positions so that the air penetrates through these clearances and there gives up the oil or grease it contains which then serves for lubrication. Naturally, such lubrication can also be effected by using oil as the pressure medium. The amount of air and oil passing through these clearances $z$ may be small depending upon various conditions and requirements. The pressure however does not build up behind the bearings for the reason that the air escapes between the caps $d$ or $e$ and the nut $o$ since the caps are screwthreaded on the shafts. Therefore a small clearance between the cap and nut leaves the so-called bearing rooms in communication with the atmosphere.

The device can also be used for simultaneously cooling the bearing. Such an embodiment is shown in Figure 2.

In this embodiment, moreover, separate annular pistons for displacing the outer ball races are not provided as in the above described embodiments, but the race itself is so formed that the pressure medium acts directly upon it. So far as the device corresponds with Figure 1, the same reference characters are used. It will be seen that the annular piston $i$ of Figure 1 is here united with the race $f3$ to form a member $v$, so that the pressure oil is introduced into the annular space between the ring $k$ and the race $v$ formed as a piston.

The oil or like pressure medium is here also supplied through the bore $s$. However, an outlet $w$ for the oil is also provided on the casing $m$. The outlet can be controlled by a cock or other throttling device $x$. The outlet pipe $w$ is connected through a bore $y$ with the other similar bearing, which is supplied with the same pressure medium.

The throttling device $x$ is so set that the pressure medium flows out through the pipe $w$ at a lower pressure than that at which it flows in through the pipe $s$. It follows that only the difference in pressure between the incoming and the outgoing pressure medium serves to take up the bearing, but that fresh, preferably cooled, pressure medium is continuously flowing in, which effects a permanent cooling of the bearing.

Preferably, as shown in the drawing, separate annular pistons or the like are used to displace the two outer ball races, it is however possible in a suitably modified device to allow the pressure medium to act directly against the side surfaces of the races to be displaced.

I claim:—

1. A bearing for a shaft, comprising a plurality of inner races rotating with the shaft, a plurality of outer races corresponding radially with the inner races and stationary relative to the shaft, anti-friction bearing elements between the races, means for moving each outer race axially relative to its inner race, said means being controlled by a pressure medium, and means for feeding the pressure medium.

2. A bearing as set forth in claim 1, wherein the means for axially moving the races comprises annular pistons bearing against the sides of the races.

3. A bearing as set forth in claim 1, wherein the means for axially moving the races comprises annular pistons bearing against the sides of the races, the pistons being spaced from each other, and means for feeding the pressure medium into the spaces.

4. A bearing as set forth in claim 1, wherein the races have the form of annular pistons, the pistons being spaced so as to permit the pressure medium to be introduced therebetween.

5. A bearing as set forth in claim 1, comprising means to lead the pressure medium from the races to the bearing elements for the purpose of lubricating the latter.

6. A bearing as set forth in claim 1, comprising means for feeding compressed air moistened with a lubricant.

7. A bearing as set forth in claim 1, comprising outlet means for the pressure medium, and means for controlling the outlet means so that the pressure medium enters the bearing at a higher pressure than that at which it leaves.

In testimony whereof I affix my signature.

KARL JUNG.